United States Patent [19]

Rainville

[11] Patent Number: 4,809,402

[45] Date of Patent: Mar. 7, 1989

[54] NON-METALLIC COMPOSITE PIANO HINGE

[75] Inventor: Gilles Rainville, North Ridge, Calif.

[73] Assignee: Rockwell International Corporation, El Segundo, Calif.

[21] Appl. No.: 794,022

[22] Filed: Nov. 1, 1985

[51] Int. Cl.⁴ .............................................. E05D 5/00
[52] U.S. Cl. ....................................... 16/372; 16/385; 16/DIG. 13
[58] Field of Search ................. 16/385, 387, 372, 273, 16/274, DIG. 13

[56] References Cited

U.S. PATENT DOCUMENTS

| | | | |
|---|---|---|---|
| 3,445,052 | 5/1969 | Lewallen | 16/DIG. 13 |
| 3,916,480 | 11/1975 | Smith | 16/DIG. 13 |
| 4,367,260 | 1/1983 | Krause | 428/287 |
| 4,545,090 | 10/1985 | Redmond | 16/DIG. 13 |

FOREIGN PATENT DOCUMENTS

| | | | |
|---|---|---|---|
| 232824 | 2/1960 | Australia | 16/274 |
| 1014697 | 12/1965 | United Kingdom | 16/385 |

Primary Examiner—Fred Silverberg
Attorney, Agent, or Firm—Charles T. Silberberg; Max Geldin

[57] ABSTRACT

A high strength composite piano hinge having an integral structure and of particular utility in aircraft, formed of two similar half portions each comprising a flange and an integrally formed loop, the integral flange and loop comprised of composite tape, fabric or filament, formed of fiber reinforced heat curable resin such as graphite fibers impregnated with epoxy resin. The loop can be formed in one embodiment by wrapping the tape or fabric around a pin, with the flanges of the hinge secured together, as by curing the composite. Stitching can be provided across the flanges adjacent to the loop, to reinforce the loop, and prevent peeling of the composite laminates or plies. The thickness of the flanges can be equal to or smaller than the outer diameter of the loop. Additional composite material or laminates can be co-cured to the flanges. After final curing of the composite material of the piano hinge, the loop is cut out at spaced intervals along the axis thereof, to provide knuckles and form one-half of the piano hinge. A pair of such hinge half portions are juxtaposed and aligned to provide the completed piano hinge, with a pin passed through the aligned knuckles.

9 Claims, 3 Drawing Sheets

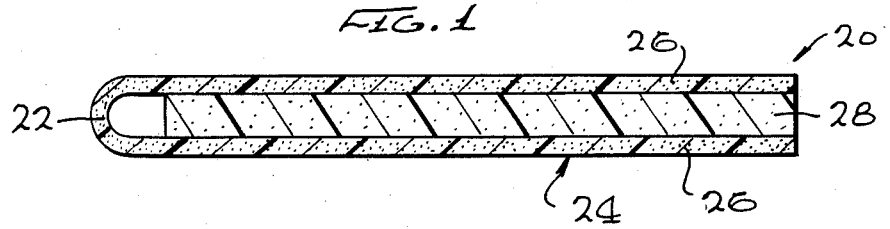
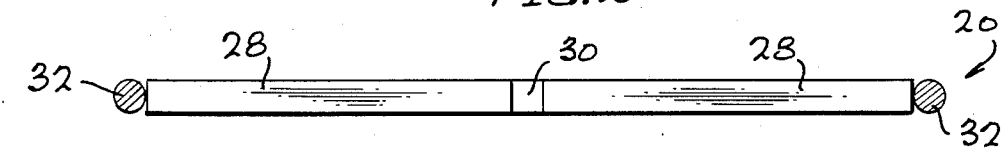
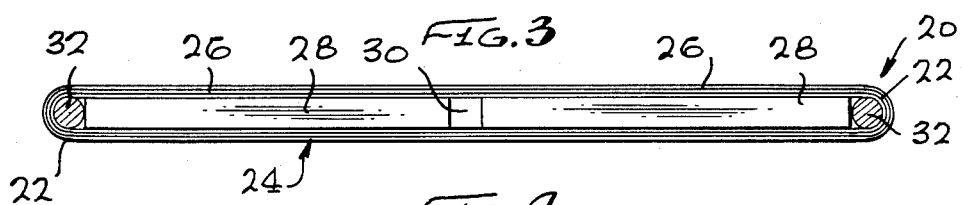
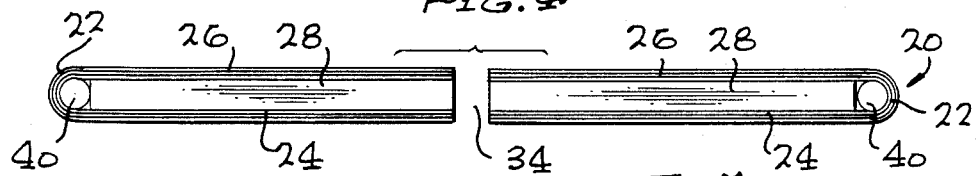
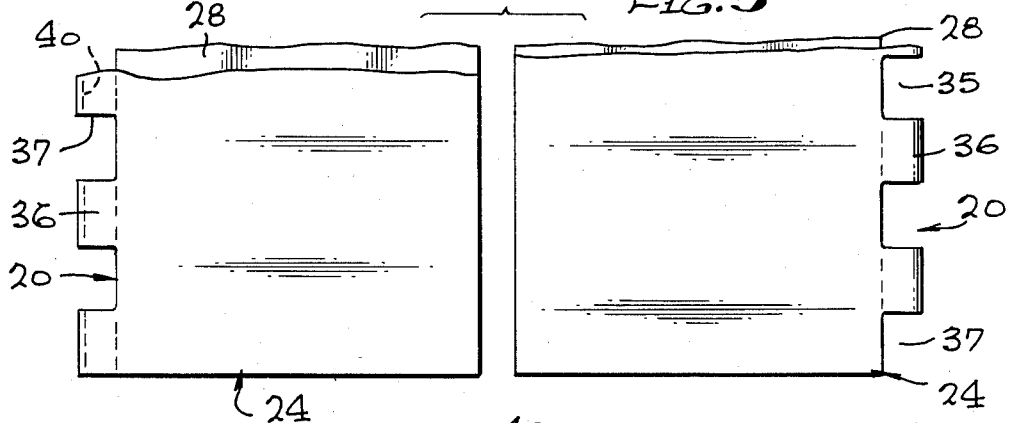
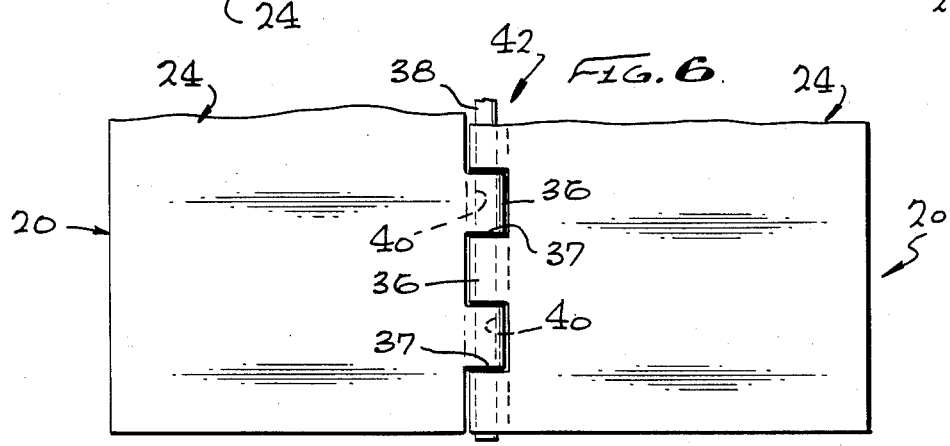

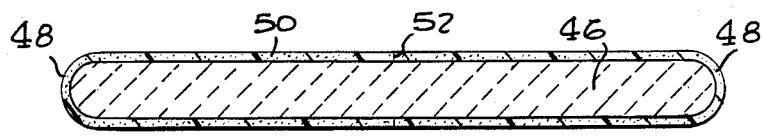
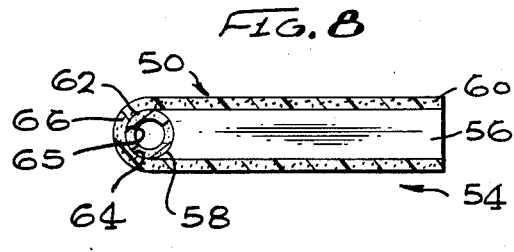
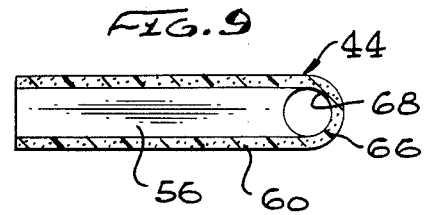
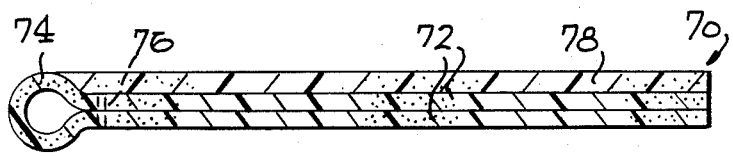
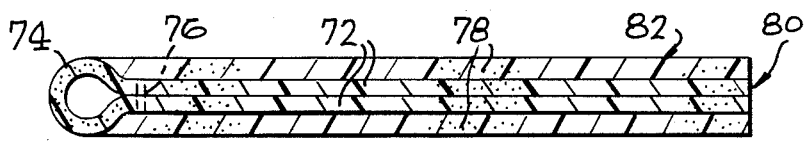
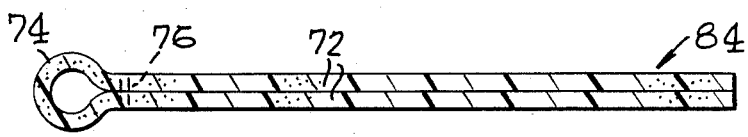
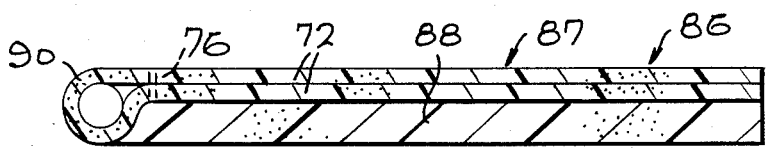
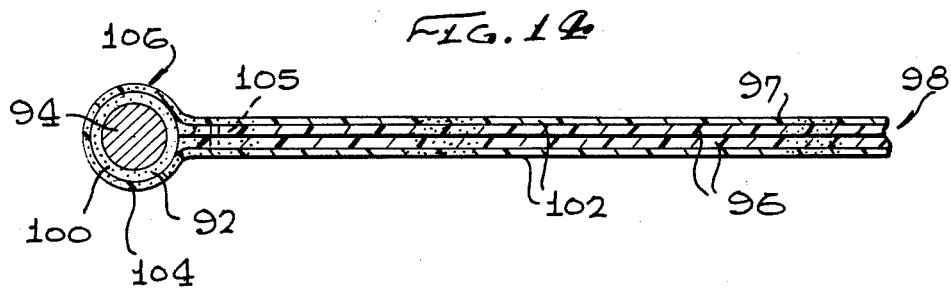

FIG. 15
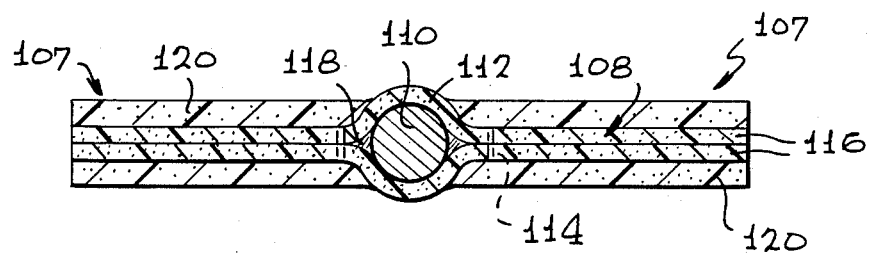
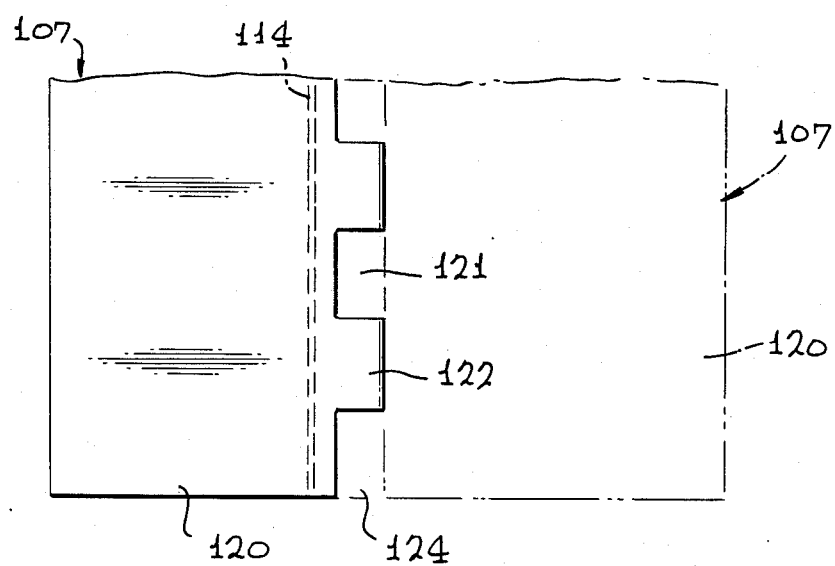
FIG. 16

NON-METALLIC COMPOSITE PIANO HINGE

BACKGROUND OF THE INVENTION

This invention relates to elongated hinges of the type generally referred to as piano hinges and more particularly is directed to an improved non-metallic composite hinge having an integral structure and of high strength and corrosion resistance.

Piano hinges are used to a substantial degree in the aircraft industry in commercial and military aircraft for supporting swingable components, particularly doors. However, heretofore, such piano hinges have been constructed largely of metallic components which are not compatible with recently developed composite structural components, e.g. constructed of graphite-epoxy materials, with which such piano hinges are to be employed. Moreover, such components have the disadvantage of having high weight and also are subject to corrosion.

U.S. Pat. No. 4,231,135 is directed to a piano hinge formed of elongated flexible flange portions, each of which includes a plurality of integral aligned knuckles which engageably cooperate with the knuckles in the other, whereby a pin can be passed through the knuckles of each flange portion forming an elongated hinge. The flanges are extruded in a flaxible and pliable material such as vinyl plastic. The hinge pin can comprise a flexible material. The piano hinge of the patent is particularly designed for use in the cushion and furniture industry so that it can be sewn to fabric or other flexible material.

U.S. Pat. No. 4,175,315 discloses an all plastic hinge formed of plastic molded hinge halves and a molded hinge pin.

U.S. Pat. No. 3,650,050 discloses a hinge exhibitor comprising hinge leaves and hinge knuckles formed of a transparent plastic material such as polycarbonate.

U.S. Pat. No. 3,703,742 is also directed to a plastic hinge and U.S. Pat. No. 3,499,183 discloses a hinge having metallic elements and plastic hinge knuckle bushings.

However, the plastic hinges of the prior art as exemplified by the hinges disclosed in the above patents are generally unsuitable for use in the aircraft industry where high strength and low weight are particularly important.

It is accordingly one object of the invention to provide an improved composite piano hinge.

Another object is the provision of a light weight composite piano hinge particularly useful as an aircraft structural component.

A still further object of the invention is to provide a composite piano hinge having an integral structure and of high strength and having particular utility for use in commercial and military aircraft, in conjunction with compatible structural components thereof, such as composite doors, and the like.

Yet another object is the provision of procedure for producing the above composite piano hinge.

SUMMARY OF THE INVENTION

According to the invention, there is provided a composite piano hinge formed of two similar hinge half portions each comprising a flange and an integrally formed loop, the integral flange and loop comprised of composite tape, fabric or filament. The loop can be formed in one embodiment by wrapping the tape or fabric around a pin, with the flanges of the hinge extending from the loop being secured together, as by curing the composite.

Additional laminates or plies of composite material can be added to the loop or to the outwardly extending flanges to impart additional strength.

Where the loop and/or the flanges of the piano hinge are relatively thin, an optional feature is to provide stitching across the piano hinge, particularly across the flanges adjacent to the loop, to reinforce the loop and prevent peeling of the composite laminates or plies.

The composite piano hinge of the invention can be made with the thickness of the flanges equal to or smaller than the outer diameter of the loop. Thus, the composite piano hinge of the invention can be constructed in symmetrical form, with the thickness of the flanges approximately equal to the outer diameter of the loop, or the piano hinge can be made unsymmetrical, with the loop positioned on one side of the piano hinge, and with additional composite material or laminates co-cured to the flanges on such one side, so that the resulting thickness of the flanges is approximately equal to the outer diameter of the loop.

After final curing of the composite material of the piano hinge, the loop is cut out at spaced intervals along the axis thereof, to provide knuckles and form one-half of the piano hinge. A pair of such hinge half portions are juxtaposed and aligned to provide the completed composite piano hinge, having a plurality of aligned knuckles through which a pin is passed to form the completed hinge.

BRIEF DESCRIPTION OF THE DRAWINGS

A better understanding of the invention may be had by reference to the following detailed description, taken in conjunction with the accompanying drawings wherein:

FIG. 1 is a cross section of one-half of a simple form of composite piano hinge according to the invention;

FIGS. 2, 3 and 4 illustrate steps in the procedure for producing the composite hinge portion of FIG. 1;

FIG. 5 is a plan view of the hinge portions produced according to the procedure illustrated in FIGS. 2, 3 and 4, following cutting of the loops to form the knuckles of the hinge;

FIG. 6 is a plan view showing the hinge portions of FIG. 5, juxtaposed to form a hinge, with a hinge pin passed through the knuckles of the loop of the two hinge half portions;

FIGS. 7, 8 and 9 illustrate procedure for producing a piano hinge similar to FIG. 1;

FIGS. 10 to 14 illustrate various embodiments of the composite hinge of the invention;

FIG. 15 illustrates still another embodiment of the composite piano hinge of the invention; and FIG. 16 is a plan view of the one-half hinge portion of FIG. 15.

DETAILED DESCRIPTION OF THE INVENTION AND PREFERRED EMBODIMENTS

Referring to the drawing, FIG. 1 illustrates a composite hinge half portion indicated at 20, according to the invention, comprising a loop 22 and an outwardly extending flat or planar flange 24. The loop and outer layers 26 of the flange 24 are comprised of a pre-preg composite filament winding, the outer layers 26 of the flange being bonded to a composite central block 28.

Referring to FIGS. 2 to 4 of the drawing, the composite hinge component 20 of the invention is produced by first forming the central block portion 28 of two of the hinge portions 20 and placing an insert 30, which can be, for example, a steel or ceramic insert, between the adjacent ends of the blocks 28. The blocks 28 can be formed of a plurality of plies of precured or staged advanced composite tape. Advanced composite material of which the loop 22 and outer layers 26 of flange 24, and the tapes forming the block 28, are formed comprise fiber reinforced heat curable resin components such as graphite fibers impregnated with a tough viscous polymer which can be thermosetting such as epoxy or epoxy-novolac resin. The resin is partially cured, e.g., "B" staged, or between "B" and "C" staged, to permit final curing by the application of heat. Other reinforcing fibers such as boron or Kevlar, which is a poly (paraphenylterephthalamide), can be employed in place of graphite. Other heat curable resins which can be employed include partially cured polyamide or polyimide resin, as well as high temperature thermoplastic matrix material such as the resin marketed as "Peek" resin, understood to be a polyether ether ketone resin, polyphenylene sulfone and polycarbonate resins.

The integral loop 22 and outer layers 26 of the flange 24 can be in the form of a pliable composite material, e.g. a partially cured pre-preg tape, such as graphite-epoxy "B" staged tape, and the layers or plies of such tape can be oriented in various directions such as 0°, 45° and 90°, to thus provide a material having high strength when finally cured. In such tapes the fibers also can be oriented at various angles to enhance strength. As illustrated in FIG. 3, such tape is wound around steel pins 32 to form the loops 22 at opposite ends of the assembly.

The assembly of FIG. 3 is then subjected to a conventional cure cycle in a mold, at sufficient pressure and temperature, e.g. at 85 psi and 350° F. for graphite-epoxy tapes or composites, to cure the composite tapes and bind the outer plies or tape 26 to the composite central portions 28.

The insert 30 and the pins 32 are then removed, and the central portion of the resulting assembly is then cut out, as shown at 34 in FIG. 4 to form the two composite hinge half portions 20. The loops 22 of each hinge portion is then cut out at spaced intervals, as shown at 37 in FIG. 5, to provide an aligned series of evenly spaced tubular cylindrical knuckles 36 formed integrally along one elongated edge of the flange 24 of each hinge half portion 20.

As shown in FIG. 6, the knuckles 36 of each of the hinge portions 20 are juxtaposed and aligned, with the knuckles 36 on the flange of one hinge half portion 20 being inserted in the spaces 37 on the flange of the other hinge half portion, to engageably cooperate with each other and permit passage of a hinge pin 38 through the hole 40 provided by the aligned knuckles 36, and forming the assembled hinge 42.

Referring to FIGS. 7 to 9 of the drawings, there is illustrated another method for producing a composite piano hinge formed of composite hinge half portions 44 and 54 similar to the hinge half portions 20 of FIGS. 1 and 4. As seen in FIG. 7, a metallic or ceramic tool 46 is provided having curved end portions 48. A filament winding or pre-preg tape, e.g. graphite-epoxy tape 50, formed of a plurality of plies, is wound around the entire outer periphery of the tool 46, including the curved end portions 48 thereof. The pre-preg composite winding 50 can be cut centrally at 52, and the tool 46 is removed, forming two composite hinge half portions 54, as shown in FIG. 8. A prefab phenolic or advanced composite, e.g. graphite-epoxy, block 56 having a concavely curved end portion 58 is inserted between the outwardly extending flanges 60 formed by the composite tape 50, in each of the hinge half portions 54.

A tube 62 in the form of a pre-preg composite, e.g. graphite-epoxy, is inserted in the circular hole 64 formed by the outer curved portion 58 of the block 56, and the inner curved surface 65 of the tape composite 50, forming the loop 66.

The assembly of FIG. 8 is then cured under heat and pressure to bond the flanges 60 of the filament winding 50 to the composite block 56, and to bond the tube 62 to the loop 66.

Alternatively, if desired, as shown in FIG. 9, the tube 62 of FIG. 8 can be omitted so that the resulting hinge half portions 44 will have a larger hole 68 between the loop 66 and the composite block 56 for passage therethrough of a steel or composite pin, similar to hinge pin 38 in FIG. 6.

In the embodiments of FIGS. 8 and 9, following curing of the assembly, the loops 66 are cut out at spaced intervals to form knuckles similar to knuckles 36 in FIG. 6, so that the hinge half portions 54 in FIG. 8 or the hinge half portions 44 in FIG. 9, can be cooperatively engaged to form a hinge as in FIG. 6, with a hinge pin passing through the tube 62 in FIG. 8, or through the larger hole 68 formed by the loop 66 in FIG. 9, to form the final piano hinge assembly, as in the case of FIG. 6.

It will be noted that the piano hinge embodiments illustrated in FIGS. 1, 4, 8 and 9 have a thick web or flange of the same thickness as the diameter of the loop at one end of the flange, and thus form relatively heavy and strong composite piano hinge half portions.

Referring to FIG. 10, there is shown another embodiment of the composite hinge half portion 70 in which the outer composite layers 72 of the flange portion are of a total thickness less than the outer diameter of the loop 74. Stitching formed of suitable fibers of thread, e.g. nylon, fiberglass, Kevlar or Dacron, at 76, is passed through the composite layers 72, closely adjacent to the loop 74, to prevent delamination of the layers 72, particularly adjacent to the loop 74, when the hinge is loaded. An additional composite tape or laminate 78 is placed over one of the layers 72 on one side of the loop 74 to cover the stitching 76. Thereafter, the layers 72 and 78 are subjected to co-curing to produce the hinge half portion 70. It is noted that the total thickness of the layers 72 and 78 is still less than the outer diameter of loop 74.

Referring now to FIG. 11 there is illustrated another embodiment of composite flange structure of the invention. FIG. 11 shows a composite piano hinge half portion 80, which is similar to hinge half portion 70 of FIG. 10, except that two additional composite layers or laminates 78 are co-cured to the laminates 72 on both sides of the loop 74, so that the total thickness of the flange portion 82 of the composite piano hinge component 80, is now equal to the outside diameter of the loop 74.

Referring to FIG. 12, the composite piano hinge half portion 84 is simply formed of the two co-cured composite laminates or layers 72 forming the loop 74, with the stitching 76 through the laminates 72, closely adjacent to the loop 74. The composite piano hinge formed by the hinge half portions 84 of FIG. 12 form a light weight, but strong composite piano hinge.

In FIG. 13, there is illustrated a composite hinge half portion 86, having a flange portion 87 formed of composite laminates 72 and an additional laminate 88 bonded to one of the composite layers 72 on one side of the loop, except that the composite loop 90 which is integral with the composite layers 72, has a different shape than the loop in FIG. 12 and is disposed unsymmetrically essentially on one side of both of the layers 72. Further, in the embodiment of FIG. 13, the additional laminate 88 covering the stitching 76 on one side of the flange of the hinge structure, is thicker than the additional laminate 78 in FIG. 10, so that the total thickness of the flange portion 87 in FIG. 13 is substantially the same as the outside diameter of the loop 90.

In the embodiment of FIG. 14, pre-preg filament fiber 92 is wound around a steel pin 94 forming an inner loop portion 100 around the pin. Two inside layers or laminates 96 of composite tape or fabric are sandwiched between two layers 102 of composite tape or fabric which are wound around the inner composite loop portion 100 to form an outer loop portion 104. The outwardly extending layers 96 and 102 comprise the flange 97 of the hinge half portion 98. The use of stitching as at 105 across the inner laminates 96 is optional.

The outer composite laminates or tapes 102 are co-cured to the inner composite layers 96, and the outer loop portion 104 integral with the outer laminates 102 is co-cured to the inner loop portion 100. Thereafter, the steel pin 94 can be removed and the resulting loop 106 formed of the loop portions 100 and 104 can be cut at spaced intervals along the axis thereof to provide the knuckles for the composite hinge half portions 98, as described above, for assembly of the completed hinge.

Now referring to FIGS. 15 and 16, there is shown yet another embodiment of the composite piano hinge of the invention. The piano hinge half portions 107 each comprises a composite graphite-epoxy tape 108 in the form of layers or plies oriented in various directions such as 0°, 45° and 90° wound around a steel or ceramic pin 110 to form the loop 112. A release agent is used on the pin 110 which functions as a molding pin.

When the loop 112 is formed, stitching 114 is provided across the laminates 116 forming the flange portion of the hinge. Such stitching prevents any peeling of the subsequently cured laminates 116. Twisted or chopped composite fibers or the like at 118 are inserted into the void area between the laminates 116 adjacent to the loop. The stitching 114 is covered with additional composite tapes or plies 120 in contact with the opposite outer surfaces of the inner laminates 116. The resulting assembly is then vacuum bagged in the usual manner and subjected to a conventional cure cycle in an autoclave, e.g. at 85 psi and 350° F. This curing operation co-cures the inner laminates 116 to the outer layers 120 of the flange portion of the hinge to form a one-half section with the loop integrally connected to the flange portion.

The pin 110 is then removed from the loop 112 and the loop is then cut out at intervals along the axis thereof, at 121, to form the knuckles 122, as shown in FIG. 16. Two of the resulting one-half hinge portions are juxtaposed to align the knuckles thereof and form an aligned hole 124 for insertion of a pivot pin for the hinge, as described above and illustrated in FIG. 6. Such hinge pin can be formed, for example, of steel or can be a composite pin, e.g. formed of continuous graphite fibers and centrally disposed chopped boron fibers, with cured epoxy resin impregnated into the continuous fibers and the chopped fibers, as disclosed in U.S. application Ser. No. 565,945, filed Dec. 27, 1983, titled High Strength Composite Threaded Fasteners, by the present applicant, and assigned to the same assignee as the present application, and now abandoned.

It is seen that the composite piano hinge of the invention formed from the composite hinge half portions, e.g. of the types shown in FIGS. 1, 11 and 13, is relatively simple to produce and provides a high strength heavy piano hinge for use with large and heavy components such as aircraft doors. Where a strong but lighter weight composite piano hinge according to the invention is desired, the hinge half portions of FIG. 12 can be employed. For composite piano hinges of intermediate weight and strength, the composite piano hinge half portions of FIGS. 10 and 14 are suitable.

As indicated, the use of stitching is desirable in embodiments such as those of FIGS. 10 to 13, in order to reinforce the cured laminates closely adjacent to the bend between the loop and the laminate layers forming the flange portions.

The composite hinge of the invention can be employed for connecting any two components which are required to be hinged. The composite piano hinge of the invention is particularly advantageous for use on composite components, particularly composite doors of aircraft. The reduced weight, low cost, compatability and high strength of the composite piano hinge of the invention, and its integral structure, result in substantially improved structures as compared to the metallic and molded plastic hinges of the prior art.

Since further changes and modifications of the invention will occur to and can be made readily by those skilled in the art without departing from the invention concept, the invention is not to be taken as limited except by the scope of the appended claims.

What is claimed is:

1. A composite piano hinge comprising a pair of like hinge half portions each comprising a flange and an aligned plurality of loops forming tubular knuckles in spaced relation along one edge of the flange, the knuckles on the flange of one hinge half portion being inserted in the spaces between the knuckles on the flange of the other hinge half portion, whereby all of the knuckles on both hinge half portions are in alignment, and a pin inserted through the loops forming the tubular portion of all of the knuckles, the flange and the loops on each hinge half portion being formed integrally and comprised of a composite fiber reinforced heat curable resin material, said flange of said hinge half portions comprising a pair of co-cured layers of said composite material, the thickness of said flange being less than the outer diameter of the loops forming said tubular knuckles, and including stitching across said layer closely adjacent to said loops.

2. The composite piano hinge of claim 1, including an additional layer of composite material co-cured to one of said pair of layers on one side of said loops, and covering said stitching on said one of said layers.

3. The composite piano hinge of claim 1, including two additional outer layers of said composite material on opposite sides of said pair of layers, and covering said stitching on said pair of layers, said outer layers being co-cured to the inner pair of layers.

4. The composite piano hinge of claim 3, said layers each comprised of graphite-epoxy tape or plies, and including twisted or chopped fibers of said composite material inserted in the void area between the pair of inner layers adjacent to the loops.

5. The composite piano hinge of claim 1, wherein said loops are unsymmetrically disposed on only one side of said layers of said flange.

6. The composite piano hinge of claim 5, including an additional layer of composite material co-cured to one of said pair of layers on one side of said loops, and covering said stitching on said one of said layers.

7. A composite piano hinge comprising a pair of like hinge half portions each comprising a flange and an aligned plurality of loops forming tubular knuckles in spaced relation along one edge of the flange, the knuckles on the flange of one hinge half portion being inserted in the spaces between the knuckles on the flange of the other hinge half portion, whereby all of the knuckles on both hinge half portions are in alignment, and a pin inserted through the loops forming the tubular portion of all of the knuckles, the flange and the loops on each hinge half portion being formed integrally and comprised of a composite fiber reinforced heat curable resin material, said hinge half portions each comprising an inner loop portion and an outer loop portion of said composite material co-cured to form said loops, a pair of inner layers of said composite material and a pair of outer layers of said composite material co-cured to said inner layer, said outer layers being integral with and forming said outer loop portions.

8. In a composite piano hinge half portion comprising a flange and an aligned plurality of loops forming tubular knuckles in spaced relation along one edge of the flange, and adapted to cooperate with a like hinge half portion to form a composite piano hinge, the improvement wherein the flange and loops on each hinge half portion are formed integrally and comprised of a composite fiber reinforced heat curable resin material, said flange of said hinge half portion comprising a pair of co-cured layers of said composite material, the thickness of said flange being less than the outer diameter of the loops forming said tubular knuckles, and including stitching across said layers closely adjacent to said loops.

9. In a composite piano hinge half portion comprising a flange and an aligned plurality of loops forming tubular knuckles in spaced relation along one edge of the flange, and adapted to cooperate with a like hinge half portion to form a composite piano hinge, the improvement therein the flange and loops on each hinge half portion are formed integrally and comprised of a composite fiber reinforced heat curable resin material, said hinge half portion comprising an inner loop portion and an outer loop portion of said composite material co-cured to form said loops, a pair of inner layers of said composite material and a pair of outer layers of said composite material co-cured to said inner layers, said outer layers being integral with and forming said outer loop portions.

* * * * *